US007077963B2

(12) United States Patent
McConchie et al.

(10) Patent No.: US 7,077,963 B2
(45) Date of Patent: Jul. 18, 2006

(54) PROCESSES FOR WATER TREATMENT

(75) Inventors: David M McConchie, New South Wales (AU); Malcolm William Clark, New South Wales (AU); Fiona Gaye Davies-McConchie, New South Wales (AU)

(73) Assignee: Nauveau Technology Investments, Port Villa (AU)

( * ) Notice: Subject to any disclaimer, the term of this patent is extended or adjusted under 35 U.S.C. 154(b) by 0 days.

(21) Appl. No.: 10/415,239

(22) PCT Filed: Oct. 26, 2001

(86) PCT No.: PCT/AU01/01383

§ 371 (c)(1),
(2), (4) Date: Sep. 17, 2003

(87) PCT Pub. No.: WO02/34673

PCT Pub. Date: May 2, 2002

(65) Prior Publication Data
US 2004/0040912 A1 Mar. 4, 2004

(30) Foreign Application Priority Data
Oct. 27, 2000 (AU) .................................. PR1054

(51) Int. Cl.
C02F 1/28 (2006.01)
(52) U.S. Cl. .................. 210/667; 210/688; 210/714; 210/716; 210/721; 210/724; 210/726; 210/904; 210/912; 405/129.25
(58) Field of Classification Search ................ 210/667, 210/683, 688, 716, 724, 725, 726, 727, 904, 210/906, 912–914; 405/129.25
See application file for complete search history.

(56) References Cited

U.S. PATENT DOCUMENTS

| 3,983,210 | A | * | 9/1976 | Steintveit | 423/106 |
|---|---|---|---|---|---|
| 4,019,982 | A | | 4/1977 | Ikari et al. | 210/30 R |
| 4,250,032 | A | | 2/1981 | Costa | 423/121 |
| 4,341,745 | A | | 7/1982 | Zopff et al. | 423/210 |
| 4,515,696 | A | * | 5/1985 | Matthew et al. | 210/713 |
| 5,271,848 | A | * | 12/1993 | Smith et al. | 210/702 |
| 5,766,485 | A | * | 6/1998 | Lind et al. | 210/711 |
| 5,853,677 | A | | 12/1998 | Avotins et al. | 423/121 |
| 6,139,753 | A | | 10/2000 | Taylor | 210/717 |

FOREIGN PATENT DOCUMENTS

| AU | 52453/86 | 7/1986 |
|---|---|---|
| AU | 52453 A | 7/1986 |
| CA | 1088961 | 11/2004 |
| DE | 3621981 | 9/1987 |
| DE | 3621981 C | 9/1987 |
| JP | 51056562 A | 5/1976 |
| JP | 58003638 A | 1/1983 |
| JP | 58081413 A | 5/1983 |
| WO | WO 93/16003 A1 | 8/1993 |
| WO | WO 97/41064 A1 | 11/1997 |
| WO | WO 02/06158 A1 | 1/2002 |

OTHER PUBLICATIONS

Derwent Abstract Accession No. 50685X/27, Class D15, E33, F09, L02 JP 51-056562 A, (OJI Paper), May 18, 1976.
Derwent Abstract Accession No. 60213 K/25, Class D15, E33, JP 58-081413 A, (Central Class), May 16, 1983.
Derwent Abstract Accession No. 16330 K/07, Class E37, J01 JP 58-003638 A, (Freund Sangyo KK), Jan. 10, 1983.
Derwent Abstract Accession No. 87-250984/36, Class E36, J01 DE 3621-981-C, (Metallgesellschaft AG), Sep. 10, 1987.
Derwent Abstract Accession No. 86-190588/30, Class E33, G01, J04, M25 DE 3501-350-A, (Kali & Salz AG), Jul. 17, 1986.
Derwent Abstract Accession No. 86-191068/30, Class E33, G01, J04, M25 EP 188-268-A, (Alcoa Chemie GMBH KALS), Jul. 23, 1986.
Abstract, "Neutralization of red mud with acid," *Nippon Light Metal Co., Ltd. Japan*, 1980, 1 page.
Abstract, Nagy, I., et al., "Conversion of red mud from aluminum manufacture into a raw material for fiertilizers and pigments," 1988, 1 page.
Abstract, Zambo, J., et al., "Formation of calcium oxide and magnesium oxide compounds in the treatment of calcitic-dolometic bauxites by the Bayer method," *Femipari Kut. Intez, Budapest, Hung.*, 1975, 50(102), 233-251, 1 page.
Abstract, Gallardo, M.M., "Neutralization of red mud from the Bayer process," *Universidade Simon Bolivar, Venez.*, 2002, p. 21, 1 page.

(Continued)

Primary Examiner—Peter A. Hruskoci
(74) Attorney, Agent, or Firm—Woodcock Washburn LLP

(57) ABSTRACT

The invention provides compositions comprising bauxite refinery residues that have been reacted with sufficient calcium and magnesium ions that they have a reaction pH of less than 10.5, and one or more water treating additives. The invention also provides processes for treatment of water containing dissolved inorganic substances involving stepwise treatment of the water in which the reacted bauxite refinery residues are added after the addition of a pH-raising additive. The invention also provides processes for treatment of water containing dissolved inorganic substances in which the reacted bauxite refinery residues are added stepwise, with one or more water treating additives also being added in at least one of the steps. The invention also provides a process for the neutralisation of bauxite refinery residue by reacting it with a base amount and a treating amount of calcium ions and a base amount and a treating amount of magnesium ions for a time sufficient to produce an at least partially-neutralized residue exhibiting a reaction pH of less than 10.5.

5 Claims, No Drawings

OTHER PUBLICATIONS

Akay, G., et al., "Phosphate removal from water by red mud using crossflow microfiltration," *Wat. Res.*, 1998, 32(3), 717-726.

Apak, R., et al., "Modeling of copper(II), cadmium(II), and lead(II) adsorption on red mud," *J. of Colloid and Interface Science*, 1998, 203, 122-130.

"Australian firm helps clear up Romanian damage," *AIMEX*, Sep. 9-12, 2003, 2 pages, down loaded Jul. 9, 2003.

Ayoub, G.M., et al., "Seawater bittern for the treatment of alkalized industrial effluents," *Wast. Res.*, 2000, 34(2), 640-656.

Bamonte, B., "To clean 1.5 billion litres of contaminated water," *Virotec International Ltd.*, http://www.asx.com.au/asx/statistics, 2000, 1 page.

Bamonte, B., "To clean 1.6 million litres of acid mine drainage water in 1 day," *Virotec International Ltd.*, http://www.asx.com/au/asx/statistics, 2000, 1 page.

Bamonte, B., "Progress report on Mt. Carrington tailings dam," *Virotec International Ltd.*, http://www.asx.com.au/asx/statistics, 2000, 2 pages.

Bamonte, B., "Tests commerce on berkleley pit water," *Virotec International Ltd.*, http://www.asx.com.au/asx/statistics, 2000, 1 page.

Bamonte, B., "Achieves remarkable results treatment of acid mine drainage," *Virotec International Ltd.*, http://www.asx.com.au/asx/statistics, 2000, 2 pages.

Bamonte, B., "Release previously highly contaminated water: APA approval," *Virotex International Ltd.*, http://www.asx.com.au/asx/statistics, 2000, 1 page.

Bamonte, B., "University of Wollongong confirms Virotec's AMD results," *Virotex International Ltd.*, http://www.asx.com.au/asx/statistics, 2000, 1 page.

Baseden, S., Environmental study of the disposal of red mud waste, *Marine Pollution Bulletin*, 1976, 4-7.

"Bauxsol™ Technology," *AWM Consulting*, downloaded Feb. 9, 2003.

"Bauxsol tailings dam treatment," *AWM Consulting*, http://web.archive.org/web, http://www.awmconsulting.com/environmental/bauxsoltailingsdamtreatment, downloaded Jan. 29, 2004, 2 pages.

Campbell, P., "A history of Bayer process presidue disposal at Gove Peninsula Northern Territory Australia," *Proceedings of the International Bauxite Tailings Workshop*, 1992, 196-206.

Case Study: Mt. Carrington Tailings Dam, "An application of Viromine™ Technology," *Virotec*, date unavailable, 7 pages.

Cooper, A., "Feature—Mining world seeks natural remedy for toxic waste," *ARK*, 2001, 4 pages.

Craig, A., "Eurallumina spa agrees to supply red mud," *Virotec International Ltd.*, 2001, 1 page.

Craig, A., "Update on trials in Romania," *Virotec International Ltd.*, http://www.asx.com.au/asx/statistics, 2001, 1 page.

Dames & Moore, "Impact assessment study/environmental impact statement for comalco Alumina Project," 1998, i-xxii, 1-274.

Dziubek, A.M., "High-pH coagulation-adsorption: a new technology for water treatment and reuse," *Wat. Sci. Tech.*, 1989, 21, 511-517.

"Further successful treatment in bala mare Romania," *Virotec International Ltd.*, http://www.asx.com.au/asx/statistics, 2001, 2 pages.

Geology 206.3, "Seawater Chemistry," *Earth Systems*, http://www.usask.ca/geology/classes/geol1206/geol206rr2.html 2003-2004, 6 pages.

Gajsek, K., "DaVinci changes how people viewed the world," *Yahoo! Groups*, http://groups.yahoo.com/group/tt-forum/message/2730, downloaded Jul. 9, 2003, 3 pages.

Glenister, D., J., et al., "Bauxite residue—development of a resource," *Proceedings of the International Bauxite Tailings Workshop*, Nov. 2-6, 1992, 302-308.

Glenister, D.J., et al., "Alkalinity of red mud and its application for the management of acid wastes," *Chemeca 85: Innovation Process Resour. Ind., Aust. Chem. Eng. Conf., 13th*, 1985, 109-113.

Graham, G.A., "Red mud disposal management at QAL," *Proc. International Bauxite Tailing Workshop*, 1992, 188-195.

Hanahan, C., et al., "A preliminary study into the use of seawater-neutralised Bauxite refinery residues (red mud) to treat acid mine drainage," *Environmental Engineering in Australia: Opportunities and Challenges, Proceedings of the Environmental Engineering Research Event*, Dec. 1998, 207-212.

Harrison, P., et al., "Options for remediation of South Lismore Lake," *Centre for Coastal Management*, 1998, 1-36.

"Heavy metal cleanup," *The Science Show*, Broadcast Saturday Jan. 4, 2000, http://www.abc.net.au/rn/science/ss/stories/s114023.htm, 10 pages, downloaded Jan. 20, 2004.

"Indep. Scientist confirms treatment of acid mine drainage," *Virotec International Ltd.*, http://www.asx.com.au/asx/statistics, 2000, 1 page.

Kilinckale, F., et al., "Solidification/stabilization of heavy metal-loaded red muds and fly ashes." *J. Chem. Tech. Biotechnol.*, 1997, 69, 240-246.

Krauskoph, K.B., et al., "Introduction to Geochemistry, 3rd Ed.," *McGraw-Hill, Inc.*, 1995, 589-591.

Lopez, e., et al., "Adsorbent properties of red mud and its use for wastewater treatment," *Wat. Res.*, 1998, 32(4), 1314-1322.

Mackinnon, I.D.R., et al., "Kaolin amorphous derivatives for the treatment of acid mine drainage," *Third Australian Acid Mine Drainage Workshop*, McLean, R.W., et al. (Eds.), Jul. 15-18, 1996, 195-201.

McConchie, D., et al., "Acid sulfate soil neutralization techniques," *Proceedings of the Workshop on Remediation & Assessment of Broadacre Acid Sulfate Soils*, Aug. 31-Sep. 2, 1999, 88-93.

McConchie, D., et al., "The use of red mud from bauxite refineries in the treatment of acid sulphate soils," *16th Australian Clay Minerals Society Conference*, Jun. 29-Jul. 1, 1998, 12-13.

McConchie, D., et al., "An innovative neutralizing treatment for acid sulfate soils," *2nd National Conference on Acid Sulfate Soils*, 1996, 227-229.

McConchie, D., et al., "The geochemistry of the sediment-water system in the red mud dam at the queensland alumina refinery," *Centre for Coastal Management*, 1998, (i)-(v), 1-119.

McConchie, D., et al., "Seawater neutralized bauxite refinery wastes: an environmental hazard or a potentially valuable resource," *Geological Society of Australia, Abstract No. 41, 13th Australian Geological Convention*, Feb. 1996, p. 282.

McConchie, D., et al., "Bauxsol tailings dam treatment," *AWM Consulting*, http://web.archive.org/web/20021217032158/http://www.awmconsulting.com, downloaded Feb. 9, 2003.

McConchie, D., et al., "Treatment of acid mine waters using seawater-neutralised bauxite refinery residues," *Geological Society of Australia, Abstract No. 59, 15th Australian Geological Convention*, Jul. 2000, p. 320.

McConchie, D., et al., "The use of seawater neutralized red mud from bauxite refineries to control acid mine drainage and heavy metal leachates," *Geological Society of Australia, Abstract No. 49, 14th Australian Geological Convention*, Jul. 1998, p. 298.

McConchie, D., "Polluted mine drainage clean up," http://web.archive.org/web/20010410040538/http://www.eco-web.com/editorial/06054.1, Apr. 10, 2001, downloaded Jan. 29, 2004, 3 pages.

McConchie, D., Fax to Fawkes, R., dated Feb. 10, 2000.

McConchie, D., "The use of seawater-neutralised bauxite refinery residues in the management of acid sulphate soils, sulphidic mine tailings and acid mine drainage," *3rd Queensland Environmental Conference*, May 25 & 26, 2000, 201-208.

McConchie, D., et al., "New treatments for the old problems of acid mine drainage and sulphidic mine tailings storage," *Paper presented at the 5th International Symposium on environmental Geochemistry*, Apr. 2000, *Abstracts* vol., p. 101.

McConchie, D., "The use of seawater-neutralised bauxite refinery residues (red mud) in environmental remediation programs," Gaballah, J., et al. (Eds.), *Proceedings of the 1999 Global Symposium on Recycling, Waste Treatment and Clean Technology, The Minerals, Metals and Materials Society*, 1999, 1, 391-400.

McConchie, D., et al., "An environmental assessment of the use of seawater to neutralize bauxite refinery wastes," *Second International Symposium on Extraction and Processing for the Treatment and Minimization of Wastes*, Ramachandran, V., et al. (Eds.), *The Minerals, metals & Materials Society*, 1996, 407-416.

McConchie, D., et al., "Application of Viromine™ Technology, Case study: Mt. Carrington tailings dam," *Virotec*, downloaded Aug. 18, 2004, http://www.virotec.com/PDF/viromine/MtCarringtonC-S.pdf, 7 pages.

"Mt. Carrington tailings dam cleanup commences today," *Press Release of Virotec International Ltd.*, Mar. 24, 2000, 1 page.

Namasivayam, C., et al., "Treatment of dairy-waste water using waste red mud," *Research & Industry*, 1992, 37, 165-167.

Perry's Chemical Engineers' Handbook, 7th Ed., Perry, R.H., et al. (Eds.), *McGraw-Hill*, 1997, 25-60 to 25-80.

"Relative composition of sea soaks™, sea water and tissue culture media," *Circulator Boot Corp.*, http://www.circulatorboot.com/introductionseasoaks.html, downloaded Sep. 23, 2003.

Roach, G.I.D., "Recovering value from bauxite tailings," *Proceedings of the International Bauxite Tailings Workshop*, Nov. 2-6, 1992, 409-418.

Schuiling, R.D., et al., "Geochemical engineering: natural solutions for environmental problems," http://web.archive.org/web/20010611131353/http://eco-web.com/editorial/01363.html, 2001, 1-15 downloaded Jan. 29, 2004.

Sheeran, B., "Advice re copper reading from the 1.6m litre dam treatment," *Virotec International Ltd.*, http://www.asx.com.au/asx/statistics, 2000, 1 page.

Sheeran, B., "Tailings dam clean-up is exceeding company expectations," *Virotec International Ltd.*, http://www.asx.com.au/asx/statistics, 2000, 2 pages.

Sherran, B., "Progress report on Mt. Carrington tailings dam," *Virotec International Ltd.*, http://www.asx.com.au/asx/statistics, 2 pages.

Sheeran, B., et al., "Additional commercial applications," *Virotec International Ltd.*, http://www.asx.com.au/asx/statistics, 2000, 1 page.

Sherran, B., et al., "Appointed by Aurual SA in Romania to clean tailings dam water," *Virotec International Ltd.*, http://www.asx.com.au/asx/statistics, 2001, 3 pages.

Sherran, B., "Further information re acid mine drainage solution," *Virotec International Ltd.*, http://www.asx.com.au/asx/statistics, 2000, 3 pages.

Sherran, B., "Welcome to Virotec Gloval Operations," various papers, *Virotec International Ltd.*, downloaded Sep. 9, 2003, 29 pages.

Successful treat. of acid mine drainage pollution-bala mare, *Virotec International Ltd.*, 2001, http://www.asx.com.au/asx/statistics, 2 pages.

Summers, R.N., et al., "Bauxite residue (red mud) increases phosphorus retention in sandy soil catchments in Western Australia," *Fertilizers Res.*, 1993, 34, 85-94.

Taylor, J.R., et al., "An overview of acid mine drainage control and treatment options, including recent advances," *Third Australian Acid Mine Drainage Workshop*, McLean, R.W., et al.. (Eds.), Jul. 15-18, 1996, 147-159.

Thomas, A., Environment & nature news—neat solution to poisonous mine tailings, http://www.abc.net.au/cgi-bin/common/printfringly.pl, 2000, 2 pages.

Thompson, C.G., et al., "Magnesium carbonate: a recycled coagulant-II," *J. Am. Water Wks. Assoc.*, 1972, 64, 93-99.

Thornber, M.R., et al., "The alkalinity of residues from alcoa of Australia limited's refineries of South-West Australia," *Proceedings of the International Bauxite Tailing Workshop*, Nov. 2-6, 1992, 136-147.

Thornber, M.R., et al., "The mineralogical and chemical properties of RE13 mud waste from the Western Australian alumina industry," *International Bauxite Tailings Workshop in Kingston*, 1986, 1-18.

Vråle, L., "Chemical precipitation of wastewater with lime and seawater," *Prog. Water Technol.*, 1978, 10(5/6), 645-656.

Wong, J. W.-C., et al., "Neutralization and cation dissolution characteristics of bauxite refining residue," *Hazardous Waste Treatment*, 1988, 247-264.

Zouboulis, A.I., et al., "Use of red mud for toxic metals removal: the case of nickel," *J. Chem. Tech. Biotechnol.*, 1993, 58, 95-101.

Koumanova, B. et al., "Phosphate removal from aqueous solutions using red mud wasted in bauxite Bayer's process," *Resources Conservation and Recycling*, 1997, 19(1):11-20.

Kappelle, L., *Australian Minerals Gazette* [Online] vol. 2, No. 35, Sep. 2000, Retrieved from the Internet: URL:http://www.virotec.com/newsdetails.cfm?id=%3D%3DAMxEzM.

* cited by examiner

PROCESSES FOR WATER TREATMENT

FIELD OF THE INVENTION

This invention relates to processes and compositions for the treatment of water contaminated with dissolved inorganic substances such as acids and/or metal ions, and to processes for preparing neutralised bauxite refinery residues suitable for use in processes and compositions for the treatment of water contaminated with dissolved inorganic substances.

BACKGROUND OF THE INVENTION

Contamination of water by inorganic species such as metal ions, phosphate ions, sulfate ions, ammonium ions, metal oxyanion complexes and cyanide ions, or by acids, is a serious environmental concern in many places. For example, acid mine drainage is a common problem wherever sulfidic mine tailings are stored. Typically, acid mine drainage contains high concentrations of trace metals including toxic metals such as arsenic, cadmium, chromium, lead and others. Containment of water with a low pH and a high toxic metals load is a serious problem, because release of such water into rivers or natural aquifers could potentially cause serious environmental damage. Strategies for management of acid mine drainage water exist but they are costly, or are not completely effective, and usually involve long term monitoring and management to avoid the reestablishment of environmentally undesirable conditions caused by the influx or redevelopment of acid conditions and consequent redissolution of adsorbed and/or precipitated contaminants.

Other environmental problems resulting from contamination of water also exist. For example, algal blooms resulting from high phosphate loads in waterways or bodies of water are an increasing concern around the world. Thus, there is a need for processes and compositions for remediating contaminated water that are simple, relatively inexpensive, and effective for the removal of inorganic contaminants.

Bauxite refinery residues, commonly known as "red mud", which have been neutralised with seawater have been shown to be capable of binding trace metals such as copper, cadmium, zinc, chromium, nickel and lead under suitable conditions.

Neutralisation of red mud is necessary because red muds are typically highly caustic, with a reaction pH of about 13.0. Consequently, they are hazardous to transport or store and storage facilities require licensing, long term monitoring and management, and final site remediation. The caustic red mud is unsuitable for most reuse applications, particularly those associated with environmental remediation, because it is unsafe to transport and apply, because it is a potential source of large quantities of sodium, and because if it were used for treatment of acidic water the presence of strong bases (particularly sodium hydroxide) creates a risk of overshooting treatment targets and replacing one set of environmental problems by another (e.g. replacing an acid problem by an alkali problem and releasing some previously bound metals that are soluble under elevated pH conditions).

The safe long term storage and management of caustic red mud is also a major problem for bauxite refineries worldwide as is the eventual rehabilitation of the storage facilities.

It is possible to neutralize red mud by adding strong acid (e.g. sulphuric) but this is an expensive management option, except where there is a surplus of waste acid. Furthermore the resulting solid material has no value as an acid neutralizing agent because most of the hydroxides and carbonates have already reacted with the added hydrogen ions, and much of the value of the material as a binding agent for trace metals and some other inorganic ions have also been lost. The caustic red mud can also be suspended in water and used to scrub potentially acid forming gases (particularly sulphur dioxide and nitrogen oxides) from industrial chimney emissions. Weak organic acids produced by decomposing vegetation (e.g. compost of mulch) can also be used to neutralize the caustic red mud during rehabilitation of red mud storage facilities, but the resulting neutralization is superficial and red mud below the treated surface can remain caustic (and potentially hazardous) for hundreds of years.

The neutralisation of red mud with seawater requires treatment of the red mud with a considerable volume of seawater relative to the volume of red mud. Accordingly there is a need for a process for neutralising red mud which is more economical and capable of being carried out in a more controlled way. Furthermore, not all bauxite refineries are close enough to the sea to be able to neutralise red mud with seawater. There is therefore a need for a process for neutralising red mud that is capable of being used at locations that are not close to the sea.

One aspect of the present invention is based on a discovery by the inventors of how seawater causes the neutralisation of red mud. This knowledge can thus be applied to enable the bauxite refinery residues to be neutralised by other means.

Although treatment of contaminated water such as acid mine drainage with neutralised red mud is capable of effecting a substantial improvement in the quality of the water, the quantities of neutralised red muds required are relatively large. Hence, there remains a need for a more economical process for treating contaminated water using neutralised red mud.

Surprisingly, the present inventors have discovered that such properties as immobilisation (including the minimisation of equilibrium repartitioning), reserve alkalinity, sludge volume reduction, and prolonged activity are enhanced and substantial reduction in the cost of treating contaminated water, such as acid mine drainage, can be achieved by treating the water in stages, in which at least one of the stages includes the use of neutralised bauxite refinery residue. The treatment also causes flocculation and the consequent reduction in the total suspended solids load in the water.

SUMMARY OF THE INVENTION

According to a first embodiment of the invention there is provided a process for treating acidic water containing dissolved inorganic substances, comprising the steps of
(i) adding a pH-raising additive in an amount sufficient to increase the pH of the water to a predetermined value; and
(ii) adding neutralised bauxite refinery residue to the water, optionally together with one or more water treating additives, in an amount sufficient to decrease the concentration of at least one of said inorganic substances in said water to below a predetermined level.

Advantageously, if any water-insoluble substance is suspended in the water after step (i), the process of the first embodiment may further include the step of separating or allowing to settle at least part of the water-insoluble substance before step (ii).

According to a second embodiment of the invention there is provided a process for treating water containing dissolved inorganic substances, comprising the steps of (i) adding a first amount of neutralised bauxite refinery residue to said water in an amount sufficient to decrease the concentration of at least one inorganic substance in said water; and (ii) adding a second amount of neutralised bauxite refinery residue to said water in an amount sufficient to decrease the concentration of at least one of said inorganic substances to below a predetermined level; wherein in at least one of step (i) and step (ii), said neutralised bauxite refinery residue is added to said water together with one or more water treating additives. Third and subsequent additions of neutralized bauxite refinery residue, with or without added water treating additives, can be applied to decrease the concentration of other inorganic substances to below predetermined levels.

Advantageously, the process of the second embodiment may further include the step of separating or allowing to settle at least part of any insoluble material suspended in the water after step (i) and before step (ii).

In a third embodiment of the invention, there is provided a composition comprising a mixture of neutralised bauxite refinery residue and a water treating additive. Typically, the composition is a mixture of neutralised bauxite refinery residue and one or more substances selected from the group consisting of alkali metal hydroxides (e.g. sodium hydroxide), alkali metal carbonates (e.g. sodium carbonate), alkaline earth metal hydroxides (e.g. calcium hydroxide), alkaline earth metal carbonates (e.g. calcium carbonate), alkaline earth metal oxides (e.g. magnesium oxide), calcium hypochlorite, sodium alum, ferrous sulfate, aluminium sulfate, soluble phosphates (e.g. ammonium phosphate), phosphoric acid, hydrotalcite, zeolites, olivines and pyroxenes (including those present in basic and ultra basic igneous rocks), barium chloride, silicic acid and salts thereof, meta silicic acid and salts thereof, and magadiite.

According to a fourth embodiment of the invention, there is provided a process for neutralising red mud, comprising mixing red mud with an aqueous treating solution containing a base amount and a treating amount of calcium ions and a base amount and a treating amount of magnesium ions, for a time sufficient to produce an at least partially neutralised red mud and a spent aqueous solution, wherein:

said at least partially neutralised red mud has a reaction pH, when one part by weight is mixed with 5 parts by weight of distilled or deionised water, of less than 10.5;

said base amounts of calcium and magnesium ions are 8 millimoles and 12 millimoles, respectively, per liter of the total volume of said treating solution and said red mud, said treating amount of calcium ions is at least 25 millimoles per mole of total alkalinity of the red mud expressed as calcium carbonate equivalent alkalinity and said treating amount of magnesium ions is at least 400 millimoles per mole of total alkalinity of the red mud expressed as calcium carbonate equivalent alkalinity, provided that said aqueous treating solution is other than seawater.

According to a fifth embodiment of the present invention, there is provided an at least partially neutralised red mud when prepared by the process of the fourth embodiment.

As used herein, it will be understood that the expression "total alkalinity of the red mud expressed as calcium carbonate equivalent alkalinity" means the alkalinity of the red mud as measured by titration against acid to an end-point of about pH 4.2, expressed as if the whole of the alkalinity so measured was due to the presence of calcium carbonate.

In the processes and compositions of the first to third embodiments of the invention the neutralised bauxite refinery residue is a by-product of bauxite refining, commonly referred to as "red mud", which has been treated with seawater, saline ground water or other water containing sufficient calcium and magnesium ions to react with substantially all of the hydroxide, carbonate, fluoride and oxalate ions present in the red mud, and for a time sufficient for the red mud to exhibit a reaction pH of less than 10.5, typically 8.2–9.0, more typically 8.4–8.8, in a standard soil test when 1 part by weight of the neutralised red mud is mixed with 5 parts by weight of distilled or deionised water. Herein, neutralised bauxite refinery residue obtained from red mud in this way will be referred to for convenience as "neutralised red mud". Typically, the neutralised red mud used in the processes of the first to third embodiments is a neutralised red mud of the fifth embodiment, although red mud neutralized by seawater can also be used.

Neutralised red mud is typically a heterogeneous mixture of minerals in which the major constituents are hematite, boehmite, gibbsite, sodalite, quartz and cancrinite, but in which other minerals are usually present in smaller amounts, such as anhydrite, aragonite, bassanite, brucite, calcite, diaspore, ferrihydrite, gypsum, hydrocalumite, hydrotalcite, ilmenite, lepidocrocite, maghemite, p-aluminohydrocalcite, portlandite and whewellite. Neutralised red mud is typically a red-coloured substance that has the ability to neutralise up to 7.5 moles of acid per kg of neutralised red mud, and to immobilise at least 1000 meq of trace metals per kg of neutralised red mud. It can also typically bind some anions, including phosphate, sulfate, metal oxyanions and cyanide.

In the process of the first embodiment, the pH raising additive is typically calcium hydroxide or sodium carbonate, but it may be any other alkaline substance, such as sodium hydroxide, potassium hydroxide, sodium bicarbonate, calcium carbonate or magnesium oxide. It is preferable that an additive be used that is not strongly alkaline because it may then be difficult to control the pH of the water being treated so that it does not become too alkaline. A further suitable pH-raising additive is the solid precipitate obtainable from treating the alkaline liquor separated from red mud in the bauxite refining process, with seawater. In the course of bauxite refining, the solid waste known as red mud is obtained, from which an aqueous liquor may be separated by known means such as heap drainage, settlement and decantation, filtration, centrifugation, and the like. Addition of seawater to this liquor results in the precipitation of a solid which can be used as a pH raising additive. Use of this material has the advantage over the use of calcium hydroxide or sodium carbonate that it does not result in higher concentrations of calcium or sodium ions in the water being treated.

A water treating additive for use together with neutralised red mud is typically a substance that is capable of changing the pH of water to which the additive is added, or is a substance that is capable of reacting with one or more ions in the water to produce an insoluble product, or is a substance that is capable of adsorbing one or more ions in the water or is a substance that can react with one or more ions in the water and render it environmentally inert. Typically, the water treating additive is selected from the group consisting of alkali metal hydroxides (e.g. sodium hydroxide), alkali metal carbonates (e.g. sodium carbonate), alkaline earth metal hydroxides (e.g. calcium hydroxide), alkaline earth metal carbonates (e.g. calcium carbonate), alkaline earth metal oxides (e.g. magnesium oxide), calcium hypochlorite, sodium hypochlorite, sodium alum, ferrous sulfate, aluminium sulfate, soluble phosphates (e.g. ammonium phosphate), phosphoric acid, hydrotalcite, zeolites, olivines and pyroxenes (including those present in basic and ultra basic igneous rocks), barium chloride, silicic acid and salts thereof, meta silicic acid and salts thereof, and magadiite. The water treating additive may also be the solids obtainable from seawater treatment of the aqueous liquor separated from red mud, as described above.

The neutralised red mud, when used together with one or more water treating additives, may be used as a mixture with the water treating additive(s)(hereinafter referred to as a "neutralised red mud blend") in the processes of the first and second embodiments of the invention, or the neutralised red mud may be added to the water separately from the water treating additive(s). In the latter case, the neutralised red mud and the water treating additive(s) may be added simultaneously or one after the other, in any order. Usually, when the neutralised red mud is used with one or more water treating additives, the neutralised red mud is used as a mixture with the water treating additive(s). Typically, the amount of water treating additive is from 0.1% to 90% by weight of the total weight of the mixture, more typically from 0.5% to 30% by weight of the total weight of the mixture, still more typically from 1% to 20% by weight of the weight of the mixture, for example 1, 2, 3, 4, 5, 6, 7, 8, 9, 10, 12, 14, 15, 16, 18 or 20% by weight of the total weight of the mixture. Thus, the compositions of the third embodiment typically consist of a water treating additive selected from the group consisting of alkali metal hydroxides (e.g. sodium hydroxide), alkali metal carbonates (e.g. sodium carbonate), alkaline earth metal hydroxides (e.g. calcium hydroxide), alkaline earth metal carbonates (e.g. calcium carbonate), alkaline earth metal oxides (e.g. magnesium oxide), calcium hypochlorite, sodium alum, ferrous sulfate, aluminium sulfate, soluble phosphates (e.g. ammonium phosphate), phosphoric acid, hydrotalcite, zeolites, olivines and pyroxenes (including those present in basic and ultra basic igneous rocks), barium chloride, silicic acid and salts thereof, meta silicic acid and salts thereof, and magadiite, in an amount of from 0.1% to 90% by weight based on the total weight of the composition, and the balance neutralised red mud.

Typically, in the process of the second embodiment, the water is acidic water. More typically, the water is acid mine drainage or acid rock drainage water. The process of the second embodiment may further comprise the step of adjusting the pH of the water before the step of adding the first amount of neutralised red mud.

The process of the second embodiment may also further comprise one or more additional steps of adding one or more further additives between the step of adding the first amount of neutralised red mud and the step of adding the second amount of neutralised red mud. Such a further additive may be any suitable water-treating additive, but will typically be neutralised red mud or neutralised red mud together with one or more water treating additives as exemplified above. Usually, the process will include the step of separating or allowing to settle at least part of any insoluble matter suspended in the water after the step of adding an additive, and before the next step of adding a different additive.

Thus, one form of the process of the second embodiment provides a process for treating water containing dissolved inorganic substances, comprising the steps of (i) adding a first amount of neutralised red mud to said water in an amount sufficient to decrease the concentration of at least one of said inorganic substances in said water;

(ii) adding a second amount of neutralised red mud to said water in an amount sufficient to decrease the concentration of at least one of said inorganic substances in said water; and (iii) adding a third amount of neutralised red mud to said water in an amount sufficient to decrease the concentration of at least one of said inorganic substances to below a predetermined level;

wherein in at least one of steps (i), (ii) and (iii), said neutralised red mud is added to said water together with one or more water treating additives.

Usually, in this form of the process of the second embodiment, the process further includes the step of (i)(a) separating or allowing to settle at least part of any insoluble material suspended in the water after step (i) and/or the further step of (ii)(a) separating or allowing to settle at least part of any insoluble material suspended in the water after step (ii). More usually, this form of the process of the second embodiment includes both step (i)(a) and step (ii)(a).

DETAILED DESCRIPTION OF THE INVENTION

In the processes of the first and second embodiments of the invention, the amounts of neutralised red mud to be used, and the nature and quantity of water treating additives used with the neutralised red mud will depend on the type of contaminants present in the water, their amounts, the initial pH of the water and the target contaminant concentrations and pH to be met.

Dissolved inorganic substances in water whose concentration can be reduced by the processes of the first and second embodiments of the invention include, but are not limited to, acids; metal ions such as lead, cadmium, chromium, mercury, copper, arsenic, aluminium, iron, zinc, cobalt, nickel, manganese and other environmentally damaging or toxic metal ions; and anions such as phosphate, oxalate, carbonate, sulfate, metal oxyanion complexes and cyanide.

Typically, where the initial pH of the water to be treated is low, for example less than about 4, the process of the first embodiment may be utilised. That is, in such conditions, a pH-raising additive such as, but not limited to, calcium hydroxide or sodium carbonate may be added to the water as a first step. Alternatively, a process of the second embodiment may be utilised wherein in the first step the neutralised red mud is used together with a pH-raising additive such as calcium hydroxide or sodium carbonate. Usually in these processes, the first step raises the pH of the water to the range of about 4–5, more usually about 4.5–4.6.

Generally, in the processes of the first and second embodiments of the invention, an amount of 0.1–50 g/L of neutralised red mud, or a mixture of it with a water treating additive, will be used in each of the steps, more typically from 1–10 g/L in each step, still more typically from 2–5 g/L per step. However, as noted above, the amounts will depend on the type and concentration of the contaminants present in the water. The amounts used will also depend on the desired quality (i.e. the pH and the concentration of inorganic contaminants, especially metal ions) of the water after treatment according to the process of the invention.

The choice of water treating additive (if any) to be used with the neutralised red mud will depend on the quality of the water to be treated. As a guide, it will usually be appropriate to choose a water treating additive that is capable of precipitating, or otherwise transferring to the solid phase such as by coprecipitation, adsorption or isomorphous substitution, one or more inorganic ions known to be present in undesirably high concentrations in the water.

For instance, a water treating additive that contains silicate or phosphate anions can be used to precipitate metal ions, especially where such metal ions are present in concentrations that exceed the capacity of, say, 10 g/L of neutralised red mud to bind them. Similarly, alum may be used as a water treating additive to assist in arsenic removal, especially at near neutral pH. Calcium containing additives may be used to assist in removal of oxalate ions, sulfate ions, fluoride ions and/or carbonate.

Where the water to be treated contains relatively high concentrations of chromium ions and/or organic matter (such as tannery wastes) it is typically appropriate to utilise a blend of neutralised red mud with 20–30% by weight, based on the total weight of the blend, of calcium hydroxide. Where the water contains high concentrations of copper and arsenic, it is typically appropriate to utilise a blend of neutralised red mud with 2–10% by weight of ferrous sulfate and 2–10% by weight of aluminium sulfate.

Where the water to be treated contains relatively high concentrations of cyanide, a hypochlorite such as calcium hypochlorite or sodium hypochlorite will typically be used as the water treating additive. Where the water to be treated contains relatively high concentrations of oxyanions, a water treating additive that lowers the pH of the water and provides aluminium and/or iron ions to bind with the oxyanions will typically be used, optionally together with minor extra amounts of calcium. Thus, in this situation the water treating additive will typically be ferric alum or a mixture of ferrous sulfate and aluminium sulfate, optionally together with calcium carbonate.

Where the water has a high acidity compared to its trace metal content (excluding iron and aluminium, which contribute to the stored acidity) an additive such as a carbonate or hydroxide is typically selected, in order to raise the pH. On the other hand, if the metal content (other than iron and aluminium) is high relative to the acidity, neutralised red mud without any additive is typically used. If the pH is above 7.5, the neutralised red mud can be rendered more effective by adding an acid generating additive such as ferrous sulphate or aluminium sulphate. Alternatively, an acid can be added to the water, but this is usually less preferred because it is more difficult to control the pH of the water if an acid is added directly. The use of a mixture of neutralised red mud with ferrous sulfate and/or aluminium sulfate can give rise to a lower pH in the immediate environment of the neutralised red mud, significantly increasing its capability to bind metal ions, without greatly affecting the pH of the bulk of the water.

For any given application, laboratory scale trials on a sample of the water to be treated will usually be carried out before treating the contaminated water body as a whole, in order to arrive at a treatment protocol which is effective and which provides a substantial reduction in the cost of treating the water compared to the cost of treating it with neutralised red mud alone. Given the teaching herein, a person of ordinary skill in the art will be able to arrive at effective treatment protocols without difficulty.

Preferably, in the processes of the first and second embodiments of the invention, treatment steps involving the addition of neutralised red mud involve the gradual addition of the neutralised red mud.

Advantageously, the neutralised red mud and any other water treating additive(s) is/are held in suspension in the water being treated for sufficient time to ensure that reactions involved in neutralising pH and removing trace metals can go to completion (or close to completion). Typically, the neutralised red mud and any water treating additives will be held in suspension in the water for a minimum of 24 hours. In deep water bodies keeping the neutralised red mud (or neutralised red mud blend) in suspension for over 24 hours presents no difficulty because the material settles slowly. Hence, for treating deep water bodies, the neutralised red mud and any water treating additives can be rapidly mixed with a portion of the water to be treated and added as a suspension to the main water body. However, in shallower water bodies (typically those less than about 3 m deep) the solids to be added are typically mixed with the water to be treated for at least 30 minutes before the suspension is added to the main water body. Suitably, all large particles in the neutralised red mud are broken up (because fine grained particles react more effectively) and any foreign matter (sticks, stones, etc.) is removed. Typically particles will all be less than 1 mm in size and most will be less than 0.1 mm in size. Most individual crystals of neutralised red mud will be less than 0.01 mm in size.

Where the water to be treated also needs to be transferred to another location (for example, to be transferred from an industrial plant to a tailings or holding dam) using pipes and pumps, the first treatment step can be achieved by adding the first increment of neutralised red mud with or without the water treatment additives before the water is pumped down the pipe to the storage facility. This procedure accelerates the water treatment reactions and protects the pipes and pumps from corrosion by acidic metal-rich water.

Any convenient method can be used to ensure that the neutralised red mud (and any other water treating additives) is held in suspension in the water being treated for sufficient time and to ensure that all large particles in the neutralised red mud are broken up. These objectives can be achieved by grinding the neutralised red mud before use, but this option adds to the cost of the treatment. Hence, it is preferred to add the neutralised red mud (or neutralised red mud blend) and some of the water to be treated to a large tank and to mix the neutralised red mud (or neutralised red mud blend) with the water using recirculating pumps or a mechanical agitator for 20–30 minutes. The resulting neutralised red mud (or neutralised red mud blend) slurry is then screened to remove any large contaminant material and dispensed into the main water body being treated using any convenient type of spray (e.g. a water cannon) or sprinkler (e.g. dispensing from a floating barge) system. Alternatively, the disaggregation and dispersion of the neutralised red mud, and/or any water treating additives, in the water can also be achieved by turbulent flow in pipes during pumping to a holding facility. It will be appreciated, however, that it is not essential that the neutralised red mud (or neutralised red mud blend) be added as a slurry. It may be convenient in some situations to add the neutralised red mud (or neutralised red mud blend) as a dry powder.

Because many of the reactions involved in acid neutralisation and metal removal by neutralised red mud are relatively slow, the rate at which the neutralised red mud (or neutralised red mud blend) is added to the water body being treated is important for most cost-effective application of the processes of the invention. If the neutralised red mud (or neutralised red mud blend) is added too rapidly, it does not react completely and more neutralised red mud (or neutralised red mud blend) will be required to achieve the desired level of treatment. Generally, therefore, the treatment is spread over a minimum of 120 hours or involves an application rate of neutralised red mud or neutralised red mud together with one or more water treating additives of not more than 1 g of neutralised red mud (or neutralised red mud and one or more water treating additives) per liter of contaminated water about every 6–12 hours; timing is typically based on whichever is the slower rate of addition in these two alternatives. It is possible to apply the neutralised red mud (or neutralised red mud and one or more water treating additives) more rapidly, but higher application rates result, which are less cost-effective. In extreme cases it may not be possible to reach desired water quality targets if the neutralised red mud or neutralised red mud blend is added too rapidly.

Therefore, the application of a suspension of neutralised red mud (or neutralised red mud blend) in water to the surface of water to be treated is typically carried out portionwise. That is, portions of the total amount of neutralised red mud (or neutralised red mud blend) to be added may be suspended in water as described above and added at intervals so as to spread the treatment over at least 120 hours or so as to apply the neutralised red mud at a rate of not more than 1 g/L of water to be treated every 2–12 hours, until the whole of the neutralised red mud to be added has been applied to the water.

Neutralised red mud and mixtures of neutralised red mud with one or more water treating additives can bind metals very efficiently and metal concentration gradients between the solid (neutralised red mud) phase and the contaminated water of in excess of 10,000:1 can develop for some metals in some water bodies. However, equilibrium repartitioning between the solid (neutralised red mud) phase and the contaminated water makes it difficult to maintain these very high concentration gradients for the time required for reactions to go to completion or until such time as all the water can be discharged. For contaminated waters with particularly high concentrations of some metals, the rate of metal release from the neutralised red mud during equilibrium repartitioning can balance or exceed the rate of metal removal as new neutralised red mud is added to the water; i.e. there is no further improvement in water quality as more neutralised red mud is added.

This problem is overcome by a process of the second embodiment in which partly treated water is separated from the used neutralised red mud solids and then water treatment is continued; only one separation and further treatment is usually necessary, but two or more may be required for highly metal contaminated water. Typically, the first separation is carried out when the pH of the water has been raised to about 4.5 and a second separation (if required) is carried out when the pH has been raised to about 6.5; however, other separation points could be more suitable for some contaminated waters.

Separation of used neutralised red mud solids and/or other inorganic insoluble matter from the aqueous phase may be achieved by conventional means. Solid matter may simply be allowed to settle in the water and may remain as a settled layer in contact with the water, but other methods such as decantation, filtration or centrifugation are more typically used.

In the processes of the second embodiment, the neutralised red mud or type of neutralised red mud blend being used is changed part way through the treatment process. Any change in blend usually coincides with a separation of the solid and liquid phases as described above. Changes in the neutralised red mud blend are typically required when the pH of the water has been raised to about 4.5 and again when the pH has been raised to about 6.5. However, changes can also be made at other points as determined during the laboratory trials for the particular water body. For example, where very low pH water with a high zinc content is being treated, a blend of neutralised red mud with 5% by weight of calcium hydroxide may be used until the pH is raised to about 4.5, then the solid and liquid phases are separated and treatment is continued using a blend of neutralised red mud with 1% by weight of calcium hydroxide until the pH is raised to about 6.7. If the use of a blend of neutralised red mud with 5% by weight of calcium hydroxide is continued when the pH has risen above about 4.5, the pH may tend to rise too rapidly for adequate pH control, and as a result the efficiency of metal removal will be reduced, or there may be a release into solution of metals which had previously been bound by the neutralised red mud. After the pH reaches about 6.7 the liquid and solids are separated a second time and treatment may be completed using a blend of neutralised red mud with 2% by weight of sodium carbonate, or neutralised red mud alone. Other blend combinations and points of change in blend can be used depending on the water composition and the results of the laboratory tests on the contaminated water.

Typical indications of when a change of water treatment additive is required are as follows: (a) when the rate of pH change becomes too rapid it will typically be appropriate to change to a neutralised red mud blend containing less alkaline additive, or to neutralised red mud without any additive; (b) when efficiency of metal removal begins to decrease it will typically be appropriate to change to a neutralised red mud blend containing sodium carbonate or other soluble carbonate to increase the formation of metal carbonates, or to change to a neutralised red mud blend containing a greater proportion of neutralised red mud (or to neutralised red mud without additives), to provide more metal binding sites; (c) if any greenish precipitate (reduced iron) begins to form it will typically be appropriate to change to a neutralised red mud blend containing less calcium hydroxide and more neutralised red mud and (d) if the rate of change of pH with further incremental additions of neutralised red mud or neutralised red mud blend decreases significantly, or the pH remains steady, it will typically be appropriate to change to a neutralised red mud blend containing calcium hydroxide or calcium carbonate, or one containing more calcium hydroxide or calcium carbonate than was being used previously.

Because it is important to avoid discharging, to natural waterways, any very fine grained neutralised red mud that may remain in suspension after treatment has been completed, the treated water is typically discharged through a filter system, even though the neutralized red mud has been discovered by the inventors to be an excellent flocculent. The simplest filter system is a sand filter, but other materials including pelletised clay minerals particularly glauconite), weathered lapilli tuff, or zeolites may be used successfully; other coarse silt to fine gravel sized filter materials can also be used alone or in combination with the minerals. Filter materials can also be selected such that they will apply a final polish to the treated water by removing some of any remaining metals as well as blocking the passage of any very fine suspended neutralised red mud particles; degraded glauconite or zeolites are particularly well suited to this purpose. Materials used in the filters need to be sufficiently fine grained to block the escape of any very fine suspended neutralised red mud particles, but not so fine as to adversely reduce water flow through the filter. Filters may be fed horizontally or they may be vertically aligned and fed either from above or from below; the preferred option is a vertically aligned filter with the water to be filtered being added from below.

Water treated by the procedures outlined above typically has a near neutral pH and a very low metal content. However, the concentration of sulfate or the total salt content, for example, may remain above acceptable levels for discharge. Where this is the case other treatments can be used after the neutralised red mud treatment to achieve the required water quality targets. Possible supplementary treatments include the use of sulfate reducing bacteria or reverse osmosis methods; other supplementary treatments are also possible. Where it is intended that a supplementary treatment is to be used, it may be cost-effective to terminate the neutralised red mud addition slightly before maximum treatment has been reached and to switch to the supplementary treatment to complete the process. For example, where sulfate reducing bacteria (SRBs) are to be used to remove sulfate, it may be more cost-effective to change to this treatment once the pH has been raised to about 7.0 and most metals have been removed, rather than waiting until the final treatment completion pH of about 8.2 has been reached; this approach is viable because the SRBs can remove zinc and manganese very efficiently and these are two of the last metals to be removed during normal neutralised red mud treatment procedures. Where SRBs or reverse osmosis methods are to be included in the treatment process, much of the initial pH neutralisation and metal removal needs to have been completed by neutralised red mud addition because the supplementary treatments do not work well for very low pH water or for water with a particularly high metal load.

The processes of the first and second embodiments of the invention provide numerous advantages over prior art processes. For example: (a) the invention provides for the use of a treatment reagent that is based on an industrial waste product and hence at many sites it can be provided at a lower cost than any alternatives; (b) the processes of the present invention provide more economical and efficient methods for treating water than is achievable by the use of neutralised red mud alone in a single-step treatment; (c) prior art treatments such as the addition of lime or other reagents do not reduce trace metal concentrations to the low levels achievable by the use of the processes of the present invention; (d) use of the processes of the present invention does not produce large quantities of sludge (which are expensive to manage or dispose of) such as are produced by the use of lime; (e) the sediment produced by using the processes of the present invention is stable and will not release metals during normal leaching whereas the sediment produced by using lime is not stable and can become costly to manage or dispose of safely; and (f) where reagents are used in prior art processes to take up metals by adsorption, those metals can easily be released if geochemical conditions change, whereas in the processes of the present invention adsorption makes only a minor contribution to metal trapping, and release of metals is greatly decreased.

Neutralisation of Bauxite Refinery Residues (Red Mud)

The principal sources of caustic and alkalinity in bauxite refinery residues are sodium hydroxide and sodium carbonate and these can be converted to low solubility materials by adding appropriate amounts of magnesium and calcium in accordance with the fourth embodiment of the present invention. The resulting material retains its acid neutralising capacity but has a reaction pH when mixed with five times its weight of water that is less than 10.5, typically 8.2 to 9.0, more typically between 8.4 and 8.8. Because the calcium and magnesium must be added as ions, the treatment must take place with the bauxite refinery residues in aqueous suspension and the calcium and magnesium added in solution. When the calcium and magnesium are added, the magnesium reacts with sodium hydroxide to form low solubility brucite and magnesium aluminium hydroxides (hydrocalumite, hydrotalcite and p-aluminohydrocalcite) and the displaced sodium remains in solution; some hydroxide is also consumed in the precipitation of additional boehmite and gibbsite. Most of the boehmite, gibbsite, hydrocalumite, hydrotalcite and p-aluminohydrocalcite is present in the red mud residues before the magnesium and calcium are added, but crystal growth continues as the pH of the mixture decreases and aluminium becomes less soluble. Simultaneously, the calcium reacts with the carbonate from the sodium carbonate to form low solubility calcite and aragonite and the displaced sodium remains in solution. Some calcium is also consumed in the formation of other minerals (whewellite, cancrinite, fluorite, portlandite, hydrocalumite, and p-aluminohydrocalcite), but this is offset by the consumption of carbonate in the precipitation of cancrinite, p-aluminohydrocalcite and hydrotalcite, and by the isomorphous substitution of magnesium for calcium in the aragonite. To treat the red mud it is necessary for the aqueous treating solution to contain certain minimum amounts of calcium and magnesium ions. A proportion of the calcium and magnesium ions reacts with the red mud, but it has been found by the present inventors that not all of the calcium and magnesium that is added will react. Specifically, it has been found that it is necessary to ensure that there are sufficient calcium and magnesium ions in the aqueous treating solution to provide a minimum of 8 millimoles of calcium and 12 millimoles of magnesium per liter of the total volume of treating solution and red mud (that is, 320 mg of calcium and 290 mg of magnesium per liter of the total volume) after the treatment is completed. The quantities are termed herein the "base amount" of each of the two ions, and are the amounts remaining in the spent solution after the red mud has been fully neutralised. It is possible to add an excess of calcium and/or magnesium, so that more than the base amount remains in the spent aqueous solution, but this is not recommended because it adds to the treatment cost without improving the effectiveness of the treatment.

In addition to the base amounts, the present inventors have discovered that in order to at least partially neutralise the red mud it is necessary to add to the red mud at least 25 millimoles, typically between 25 and 50 millimoles, of calcium and at least 400 millimoles, typically between 400 and 600 millimoles, of magnesium per mole of total alkalinity of the red mud expressed as the calcium carbonate equivalent alkalinity. These amounts are herein termed the "treating amounts" and correspond to at least 10 g of calcium, typically from 10 g to 20 g of calcium, per kg of calcium carbonate equivalent alkalinity and at least 96 g of magnesium, typically from 96 g to 144 g of magnesium per kg of calcium carbonate equivalent alkalinity. The preferred treating amounts are 25 millimoles of calcium and 400 millimoles of magnesium per mole of total alkalinity expressed as the calcium carbonate equivalent alkalinity (i.e. 10 mg of calcium and 96 mg of magnesium per g of calcium carbonate equivalent alkalinity).

To achieve optimum precipitation of low solubility hydroxides (mainly brucite) and carbonates (mainly calcite and aragonite) and effective neutralisation of the caustic in the red mud, the ratio of the treating amount of magnesium to the treating amount of calcium in the aqueous treating solution should preferably be in the range of 12 moles of magnesium per mole of calcium (i.e. 7.2 g Mg: 1 g Ca) to 20 moles of magnesium per mole of calcium (i.e. 12 g Mg:

1 g Ca). Preferably, the ratio of the treating amount of magnesium to the treating amount of calcium is in the range of 14 moles of magnesium per mole of calcium (i.e. 8.4 g Mg: 1 g Ca) to 18 moles of magnesium per mole of calcium (i.e. 10.8 g Mg: 1 g Ca) and the more preferred ratio is 16 moles of magnesium per mole of calcium (i.e. 9.6 g Mg: 1 g Ca).

The calcium and magnesium can be obtained from any suitable source, but they must be in solution when added to the red mud. Suitable sources of calcium and magnesium are hard groundwater brines, natural saline brines (e.g. evaporatively concentrated seawater, bittern brines from salt mines or salt lake brines), saline wastewaters (e.g. from desalination plants), solutions made by dissolving calcium chloride and magnesium chloride, or a combination of two or more of these sources of calcium and magnesium. It will be understood that the aqueous treating solution used must contain calcium and magnesium in concentrations of at least the respective base amounts. Preferably, the aqueous treating solution will contain calcium and magnesium in concentrations of at least twice the respective base amounts. Where artificial solutions are made by dissolving calcium and magnesium salts, it will be understood that salts of sufficient solubility must be used; chloride salts provide the simplest and most cost-effective option, but nitrates could also be used. Preferably, the salts used do not contribute to the alkalinity of the treating mixture. Accordingly, oxides and hydroxides of magnesium and calcium are best avoided. Salts of magnesium and calcium are selected so that anions present in one of them do not react in solution with cations of the other to produce a product of low solubility. For this reason, magnesium sulfate is unsuitable because it can lead to the formation of low solubility calcium sulfate (gypsum) and calcium sulfate itself is of little benefit because of its low solubility.

In the process of the fourth embodiment, the red mud is mixed with the aqueous treating solution and typically agitated with the solution by suitable means. Agitation can be, for example, by stirring, circulation pumping, aeration or any other convenient means. Reaction of the red mud and the aqueous treating solution is initially rapid, but it is preferable to allow the treating solution to contact the red mud for sufficient time to allow the neutralisation to proceed essentially to completion. Typically, the red mud is contacted with the aqueous treating solution for at least two hours, more typically up to 24 hours. Typically, the red mud is treated with the aqueous treating solution at ambient temperature, although lower or higher temperatures could also be used. However, in view of the rapidity of the neutralisation reactions, use of elevated temperatures does not confer any significant benefit. Use of lower temperatures than ambient also confers no benefit.

Following treatment by the processes described above, the at least partially neutralised red mud is allowed to settle and the spent aqueous solution is separated by decantation or centrifugation (or any other suitable process or any combination of procedures) and discharged in an appropriate manner. As a result of the treatment, the aqueous treating solution becomes depleted in calcium and magnesium (and possibly in some trace metals) and enriched in sodium; the at least partially neutralised red mud is enriched in calcium and magnesium and has a substantially lower sodium content. The at least partially neutralised red mud can be stored safely and has a reaction pH (one part by weight of solids to five parts by weight of water) of less than 10.5. Minerals within the solid fraction retain their acid neutralising capacity and may have a slightly increased acid neutralising capacity if the solutions being used to complete the treatment had some alkalinity themselves. The neutralised solids obtained in this way retain some associated water containing predominantly sodium ions. Although it is safe to store these solids indefinitely, further processing steps may be applied.

For example, the solid fraction may be screened to remove any foreign matter (e.g., sticks and stones) and then dried using one or more conventional procedures; e.g., filter press, air drying, kiln drying, etc. Additionally or alternatively, although removal of pore water sodium is not normally necessary for most applications, if a low sodium content material is required, pore water sodium can be removed by washing the neutralised red mud with low sodium water (fresh water) and the solids optionally dried. After the solids are dried sufficiently, they can be broken up and screened to select desired size fractions. Optionally, the resultant dried solids may be blended with one or more other water treating additives to provide a composition in accordance with the third embodiment of the invention. Where it is intended that the neutralised red mud will be applied as a slurry, complete drying of the neutralised solids is not essential. Typically, a balance needs to be struck between the cost of additional drying and the cost of transporting the additional moisture to the site where the neutralised red mud is to be used.

The dried solid typically has a fine grained structure with about 80% of its total weight having a particle size of less than 10 microns. Solids having a near-neutral soil reaction pH (for example between 8.4 and 8.8) retain a high acid neutralising capacity and have Toxicity Characteristic Leaching Procedure values sufficiently low that they can be transported and used without the need to obtain permits that are usually required for the transport of potentially hazardous materials.

EXAMPLES

Examples 1–11

Compositions Including Neutralised Red Mud in Accordance with the Invention

The following Examples illustrate compositions in accordance with the invention containing neutralised red mud and an alkaline water treating additive.

| Example No. | 1 | 2 | 3 | 4 | 5 | 6 | 7 | 8 | 9 | 10 | 11 |
|---|---|---|---|---|---|---|---|---|---|---|---|
| Neutralised red mud | 99% | 95% | 90% | 99% | 95% | 90% | 80% | 70% | 99% | 95% | 90% |
| Calcium hydroxide | — | — | — | 1% | 5% | 10% | 20% | 30% | — | — | — |
| Sodium carbonate | 1% | 5% | 10% | — | — | — | — | — | 1% | 5% | 10% |

In the above examples, all percentages are expressed in terms of percentages by weight of the total composition.

Example 12

Treatment of Contaminated Water

A contaminated water was treated in a two step process in accordance with the invention as follows. The neutralised red mud used in the steps of this process was a sample of neutralised red mud obtainable from Virotec International Ltd., Sanctuary Cove, Queensland, under the name "Bauxsol". The name Bauxsol is a trade mark of Virotec International Ltd.

Step 1: Amounts of about 1 g of a composition in accordance with example 5 per liter of the water were added to the water at intervals of about 2 hours, until the pH reached about 6.7. This required 4–5 grams of the composition per liter of the water.

Step 2: The mixture was allowed to settle for about 24 hours, and the aqueous phase was separated.

Step 3: Amounts of about 1 g of a composition according to example 1, per liter of the water, were added to the aqueous phase from Step 2 about every 2 hours, until the pH reached about 8.2. This required 3–4 grams of the composition per liter of the water.

Step 4: The mixture was allowed to settle for about 24 hours and the aqueous phase was separated.

The composition of the aqueous phase during the above treatment was as follows:

|   | Before treatment | After Step 2 | After Step 4 |
|---|---|---|---|
| pH | 2.8 | 6.8 | 8.2 |
| Al (µg/L) | 12340 | <25 | <5 |
| Cd (µg/L) | 94 | <30 | <0.5 |
| Cu (µg/L) | 314 | <30 | 4.4 |
| Fe (µg/L) | 38120 | <10 | <1 |
| Pb (µg/L) | n.d. | <1 | <0.5 |
| Mn (µg/L) | 9988 | ~8,000 | 1,027 |
| Ni (µg/L) | 60 | <50 | 22 |
| Zn (µg/L) | 122388 | ~60,000 | 17.6 |

(n.d. = not determined)

Example 13 (Comparative)

Separate samples of the same water treated as described in Example 12 were treated with different quantities of Bauxsol, each treatment being in a single step. Samples of the water were removed after 48 hours of contact with the Bauxsol, and the composition of the water was as follows

| Quantity of Bauxsol added (g/L): | 0 | 5 | 10 | 25 | 50 |
|---|---|---|---|---|---|
| pH | 2.8 | 6.83 | 6.94 | 7.86 | 8.08 |
| Al (µg/L) | 12340 | 4 | 4 | 11 | 23 |
| Cd (µg/L) | 94 | 13 | <1 | <1 | <1 |
| Cu (µg/L) | 314 | <1 | <1 | <1 | <1 |
| Fe (µg/L) | 38120 | <1 | <1 | <1 | <1 |
| Mn (µg/L) | 9988 | 8637 | 7977 | 705 | 47 |
| Ni (µg/L) | 60 | 48 | 34 | 5 | <1 |
| Zn (µg/L) | 122388 | 64307 | 20350 | 146 | 53 |

It will be seen that in order to obtain water of comparable quality (particularly in relation to the zinc concentration, for which the discharge limit in Australia is currently 50 µg/L) to that obtained in Example 12, at least 3 times the quantity of Bauxsol was required in this single step treatment, compared to the two stage treatment described in Example 12. Furthermore, it will be seen that when large quantities of Bauxsol are used, aluminium removal efficiency begins to decrease.

Example 14

About 3 million liters of water was treated using a two stage treatment process involving two different neutralised red mud blends. The neutralised red mud used in this process was neutralised red mud obtainable from Virotec International Ltd., Sanctuary Cove, Queensland, under the name of "Bauxsol". The name Bauxsol is a trade mark of Virotec International Ltd.

Step 1: 7 grams of a composition in accordance with Example 7 per liter of water were added as the water was pumped down a pipe to a holding dam, 6 kilometers away; the time required to reach the holding dam was about 5 hours.

Step 2: The mixture was allowed to settle and the solid phase was allowed to separate to the bottom.

Step 3: Amounts of about 0.75 grams of a composition in accordance with Example 5 per liter of the water were added to the water at intervals of about 24 hours. This required 4.65 grams of the composition per liter of the water.

Step 4: The mixture was allowed to settle for about 24 hours for the aqueous and solid phases to separate.

|   | Before treatment | After Step 2 | After Step 4 |
|---|---|---|---|
| pH | 3.22 | 6.8 | 8.3 |
| Al (mg/L) | 109 | 0.1 | <0.05 |
| Cd (mg/L) | <0.05 | <0.05 | <0.05 |
| Cu (mg/L) | 0.24 | 0.08 | <0.05 |
| Fe (mg/L) | 235 | <0.1 | <0.1 |
| Pb (mg/L) | 1.19 | <0.05 | <0.05 |
| Mn (mg/L) | 226 | 24.3 | 2.32 |
| Ni (mg/L) | 0.43 | <0.05 | <0.05 |
| Zn (mg/L) | 19.79 | 2.1 | 0.04 |
| $SO_4^{2-}$ (mg/L) | 4961 | n.d. | 1692 |
| TDS (mg/L) | 13900 | n.d | 6140 |

(n.d. = not determined; TDS represents total dissolved solids)
(Note: Mn concentrations were continuing to decrease when the last sample reported above was taken.)

Example 15

A caustic red mud sample from a bauxite refinery was neutralised by adding a seawater to which calcium chloride and magnesium chloride had been added; the use of pure seawater at this refinery was not possible because dilution of the ambient seawater by fresh water from a nearby river meant that the concentrations of both calcium and magnesium were below the minimum required values (base amount values) of 320 mg/L calcium and 290 mg/L magnesium. The concentrations of calcium and magnesium in the seawater near the refinery were only 10 mg/L calcium and 20 mg/L magnesium.

Two liters of the caustic red mud suspension, with an initial total alkalinity of 146,000 mg/L (as calcium carbonate equivalent alkalinity) and an initial pH of 13.19, were placed in a large beaker and treated with 8.7 liters of saline brine. The saline brine was prepared by adding 20 g of calcium chloride (i.e. 2 g/L) and 150 g of magnesium chloride (i.e.

15 g/L) to 10 L of artificial seawater made up to simulate the ambient seawater near the refinery (i.e. an initial calcium concentration of 10 mg/L and a magnesium concentration of 20 mg/L). The mixture was then agitated for 1 hour, left to stand for 24 hours and centrifuged to separate the solid fraction. The solids fraction had a reaction pH (1 part solid to 5 parts water) of 8.54. The liquid fraction had a residual calcium concentration of 305 mg/L and a residual magnesium concentration of 269 mg/L; these remaining concentrations approximate the minimum (base amount) concentrations of magnesium and calcium required to achieve complete neutralisation.

In this example, and in all other neutralisation work using this procedure, the exact addition volumes required depend on the target pH for the treated mixture. Near the end point the amount of treating solution required can vary by up to 10% for a change of as little as 0.2 pH units as illustrated in Example 16. It is therefore recommended that mixing ratios for all treatments need to be bench tested in the laboratory before being applied on larger scales in the field.

Example 16 (Comparative)

A caustic red mud sample from another bauxite refinery was neutralised by adding a seawater that had a similar composition to world average seawater. The mixture was agitated for 10 mins then left to stand for 2 hours between the addition of each seawater increment.

The reaction pH of the original red mud was 13.22 and the pH for various mixtures of red mud and seawater are shown in Table 1

TABLE 1

| Volume of seawater:volume of red mud | pH for the mixture |
| --- | --- |
| 0:1 | 13.2 |
| 2:1 | 12.3 |
| 4:1 | 11.3 |
| 5:1 | 10.0 |
| 7:1 | 9.3 |
| 8:1 | 9.0 |
| 10:1 | 8.8 |
| 11:1 | 8.7 |
| 12:1 | 8.6 |
| 13:1 | 8.5 |

The pH values given in Table 1 are the pH values of the aqueous solution when mixed with the red mud. These values are not necessarily the same as the reaction pH of the neutralised red mud after it is separated from the aqueous treating solution and then mixed with five parts by weight of distilled or deionised water. In fact the latter pH will typically be higher because under the treatment conditions described herein the red mud and the aqueous treating solution will not usually reach equilibrium.

As seen from Table 1, the change in pH as more seawater is added is not linear and reflects a series of complex precipitation, dissolution and dilution reactions that take place during neutralisation. The solids extracted following centrifugation had a reaction pH (1 part solid to 5 parts water by weight) of 8.46.

Example 17

This example is similar to Example 16, except that in this treatment the seawater had been evaporated. Specifically, an original 30 liters of seawater was evaporated to a volume of 20 liters prior to treating the red mud. The treatment conditions were otherwise the same as for Example 16.

The pH of the aqueous liquid in contact with the red mud, for various mixtures of red mud and the evaporated seawater are shown in Table 2

TABLE 2

| Volume of water:volume of red mud | pH for the mixture |
| --- | --- |
| 0:1 | 13.2 |
| 1:1 | 12.5 |
| 2:1 | 11.2 |
| 2.5:1 | 10.0 |
| 3.5:1 | 9.4 |
| 4:1 | 9.1 |
| 5:1 | 8.9 |
| 5.5:1 | 8.7 |
| 6:1 | 8.6 |
| 6.5:1 | 8.4 |

These results demonstrate the surprising decrease in the volume of treating water needed to achieve a given final pH, compared to the use of seawater. In this example, to reach a pH of about 8.6 for the mixture, about 6 parts by volume of the evaporated seawater, which was obtained from 9 parts by volume of the original seawater, was needed. However, to achieve the same pH by treating the red mud with unevaporated seawater, about 12 parts by volume of the seawater were needed. The reduction in the volume of water required reflects both the increased calcium and magnesium concentration in the evaporatively concentrated seawater and the reduction in the amount and proportion of the calcium and magnesium required to supply the base amount once the water volume is reduced.

The ability, which the present invention provides, to neutralise red mud by a substantially smaller volume of water than by the use of seawater, is a significant benefit that is a consequence of the inventors' discovery that the amounts of calcium and magnesium required to at least partially neutralise red mud each comprise a base amount and a treating amount, as defined herein.

The invention claimed is:

1. A process for treating water containing dissolved inorganic substances including metal ions, comprising the steps of
    (i) adding a first amount of neutralized bauxite refinery residue to said water in an amount sufficient to decrease the concentration of at least one inorganic substance in said water; and
    (ii) adding a second amount of neutralized bauxite refinery residue to said water in an amount sufficient to decrease the concentration of at least one of said inorganic substances to below a predetermined level;
    wherein in at least one of step (i) and step (ii), said neutralized bauxite refinery residue is added to said water together with one or more water treating additives; selected from the group consisting of alkali metal hydroxides, alkali metal carbonates, alkaline earth metal hydroxides, alkaline earth metal carbonates, alkaline earth metal oxides, calcium hypochlorite, sodium hypochlorite, sodium alum, ferrous sulfate, aluminum sulfate, soluble phosphates, phosphoric acid, hydrotalcite, zeolites, olivines, pyroxenes, barium chloride, silicic acid and salts thereof, meta silicic acid and salts thereof, and magadiite; wherein said neutralized bauxite refinery residue is red mud that has been treated with seawater, saline ground water or other water containing sufficient calcium and magnesium ions to react with substantially all of the hydroxide, carbonate, fluoride and oxalate ions present in the red mud, and for a time sufficient for the red mud to exhibit a reaction pH of less than 10.5, in a standard soil test when 1 part by weight of the neutralized red mud is mixed with 5 parts by weight of distilled or deionized water; and said process further includes the steps of (i)(a) separating or allowing to settle at least part of any insoluble material suspended in the water after step (i), and (ii)(a) separating or allowing to settle at least part of any insoluble material suspended in the water after step (ii).

2. A process according to claim 1, further comprising the step of adding a pH-raising additive to the water in an amount sufficient to increase the pH to a predetermined value, prior to step (i), wherein said pH raising additive is selected from the group consisting of calcium hydroxide, sodium carbonate, sodium hydroxide, potassium hydroxide, sodium bicarbonate, calcium carbonate and magnesium oxide.

3. A process according to claim 1 further comprising at least one subsequent addition of neutralized bauxite refinery residue, with or without added water treating additives, in an amount sufficient to decrease the concentration of at least one other inorganic substance to below a predetermined level.

4. A process according to claim 1, further comprising the step of
(iii) adding a third amount of neutralized red mud to said water in an amount sufficient to decrease the concentration of at least one of said inorganic substances to below a predetermined level.

5. A process according to claim 1, wherein said water treating additive is selected from the group consisting of sodium hydroxide, sodium carbonate, calcium hydroxide, calcium carbonate, magnesium oxide, calcium hypochlorite, sodium hypochlorite, sodium alum, ferrous sulfate, aluminium sulfate, ammonium phosphate, phosphoric acid, hydrotalcite, zeolites, olivines, pyroxenes, barium chloride, silicic acid and salts thereof, meta silicic acid and salts thereof, and magadiite.

* * * * *